(12) United States Patent
Kern et al.

(10) Patent No.: US 12,517,255 B2
(45) Date of Patent: Jan. 6, 2026

(54) LIDAR SENSOR SYSTEM

(71) Applicant: Robert Bosch GmbH, Stuttgart (DE)

(72) Inventors: Oliver Kern, Renningen (DE);
Sebastian Banzhaf, Boetzingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 1079 days.

(21) Appl. No.: 17/456,464

(22) Filed: Nov. 24, 2021

(65) Prior Publication Data

US 2022/0171070 A1 Jun. 2, 2022

(30) Foreign Application Priority Data

Nov. 30, 2020 (DE) .................. 10 2020 215 039.7

(51) Int. Cl.
| | | |
|---|---|---|
| *G01S 17/93* | (2020.01) | |
| *G01S 7/48* | (2006.01) | |
| *G01S 17/34* | (2020.01) | |
| *G01S 17/58* | (2006.01) | |
| *G01S 17/931* | (2020.01) | |

(52) U.S. Cl.
CPC .......... *G01S 17/931* (2020.01); *G01S 7/4808* (2013.01); *G01S 17/34* (2020.01); *G01S 17/58* (2013.01)

(58) Field of Classification Search
None
See application file for complete search history.

(56) References Cited

U.S. PATENT DOCUMENTS

| | | | |
|---|---|---|---|
| 1,052,727 A | 2/1913 | Kissock | |
| 2016/0091599 A1 | 3/2016 | Jenkins | |
| 2019/0033079 A1* | 1/2019 | Wang | H04B 10/116 |

FOREIGN PATENT DOCUMENTS

| | | | | |
|---|---|---|---|---|
| CN | 105372634 B | * | 4/2019 | ......... G01S 13/0209 |
| DE | 102018111251 A1 | | 11/2018 | |
| EP | 2787736 A2 | * | 10/2014 | ......... A61B 1/00009 |
| WO | 2018144853 A1 | | 8/2018 | |

* cited by examiner

*Primary Examiner* — Hovhannes Baghdasaryan
(74) *Attorney, Agent, or Firm* — NORTON ROSE FULBRIGHT US LLP

(57) ABSTRACT

A lidar sensor system. The lidar sensor system includes a transmission unit having a laser source, a phase modulator for modulating a phase of the light of the laser source, and a transmission optic for emitting the modulated light; a reception unit having a reception optic for receiving light reflected from an object and having an evaluation unit for evaluating the light received by the reception optic; the transmission unit being embodied to emit several transmission sequences of the light; each transmission sequence having a first portion and a second portion; the first portion being an unmodulated constant-phase signal; the second portion being a signal phase-modulated by the phase modulator; and the evaluation unit being embodied to determine at least an absolute value of a Doppler frequency based on the first portion, and to determine a distance to the object based on the Doppler frequency and the second portion.

10 Claims, 8 Drawing Sheets

LIDAR SENSOR SYSTEM

CROSS REFERENCE

The present application claims the benefit under 35 U.S.C. § 119 of German Patent Application No. DE 102020215039.7 filed on Nov. 30, 2020, which is expressly incorporated herein by reference in its entirety.

FIELD

The present invention relates to a lidar sensor system. The lidar sensor system is usable in particular in a vehicle. The lidar sensor system enables reliable Doppler compensation.

BACKGROUND INFORMATION

Lidar sensor systems are available in the existing art. They operate for the most part on the "direct detection" principle, whereby an intensity of a back-reflected light is detected in order to infer an object in the environment. Lidar systems that have coherent receivers are also available. Such systems, for example, emit frequency-modulated signals so that on the one hand a distance to the detected object, and on the other hand a velocity of the detected object, can be detected. The underlying frequency modulated continuous wave (FMCW) method is conventional in radar technology. As an alternative to frequency modulation, it is also possible to use phase codes, in which the phase of the emitted light is modulated. One such method is described, for example, in PCT Patent Application No. WO 2018/144853 A1.

SUMMARY

A lidar system according to the present invention enables reliable Doppler compensation for phase-modulated light signals. It thus makes possible, in particular, compensation for the large frequency shifts that are possible in the context of the lidar measurement principle due to the Doppler effect, in order furthermore to enable a correlation between an emitted signal and received signal; this in turn allows a determination of the light transit time and thus of the distance between the lidar system and a detected object. The configuration of the lidar sensor system according to the present invention remains lean; in particular, a velocity estimate can be carried out with little hardware outlay. The use of phase codes furthermore enables improved parallelizability of the lidar sensor system, a capability for detecting several targets, and reliable and unequivocal distance estimation.

In accordance with an example embodiment of the present invention, the lidar sensor system has a transmission unit and a reception unit. The transmission unit in turn has a laser source, a phase modulator, and a transmission optic. The phase modulator serves to modulate a phase of the light of the laser source. The transmission optic serves to emit the light, modulated by the phase modulator, into an environment of the lidar sensor system. The light emitted by the transmission unit into the environment thus encompasses a phase code that is introduced by the phase modulator.

The reception unit has a reception optic and an evaluation unit. The reception optic serves to receive light from the environment. In particular, it is thereby possible to receive reflected light that has been emitted from the transmission unit and reflected at an object in the environment. The evaluation unit serves for evaluation of the light received by the reception optic, the received light in particular representing a light signal.

The transmission unit is preferably furthermore embodied to emit several transmission sequences of the light. Each transmission sequence has a first portion and a second portion, the first portion being an unmodulated constant-phase signal and the second portion being a signal phase-modulated by the phase modulator. Thus at least part of the transmission sequence encompasses an aforesaid phase code, while another part of the emitted light contains no phase coding. This type of configuration of the transmission sequence enables reliable Doppler estimation so that Doppler compensation can thereby be carried out. The evaluation unit of the reception unit is therefore embodied to ascertain, based on the first portion, at least an absolute value of the Doppler frequency. The evaluation unit is embodied to determine a distance to the object based on the Doppler frequency and the second portion.

As described above, the received light signal is on the one hand time-shifted, the distance to the object that reflects the light being expressed in the time shift; and is furthermore frequency-shifted as a result of the Doppler effect. An FFT analysis of the received signal would result, because of the spectrum of the phase code, in a Doppler frequency that would be difficult or in fact impossible to detect. The subdivision of the transmission sequence into the first portion and the second portion thus makes possible a reliable assessment of the Doppler frequency based on the first portion, i.e., the portion having no phase code. The evaluation unit is thus configured to perform a Doppler compensation based on the Doppler frequency thereby determined and then, subsequently to the Doppler estimation, to detect the time shift so as to arrive at a distance estimate therefrom.

Preferred embodiments and refinements of the present invention are disclosed herein.

In accordance with an example embodiment of the present invention, provision is preferably made that the evaluation unit is a simple demodulator. Alternatively or additionally, the evaluation unit is a complex demodulator. The use of a simple demodulator makes possible a reliable distance estimate and an estimate at least in terms of absolute value of the speed of the detected object in the environment. If a complex demodulator is used, a correct-sign estimate of the object's velocity is also enabled.

Particularly advantageously, the evaluation unit encompasses a photodetector as well as an evaluation logic system. The evaluation logic system encompasses in particular an analog/digital converter and a digital signal processor.

Each second portion of each transmission sequence is preferably a unique code. The unique code possesses a unique autocorrelation function. It is thereby possible to recognize a time shift of the received signal based on the cross-correlation of the received second portion with the originally emitted transmission sequence. The distance to the object in the environment at which the transmission sequence was reflected can in turn be recognized from that time shift. Because the Doppler frequency can already be ascertained based on the first portion of each transmission sequence, the time shift can be ascertained in simple and uncomplicated fashion based on the second portion of the transmission sequence.

Particularly advantageously, the codes are biphase codes, in particular Barker codes or maximum length sequences (MLS), or Gold codes, or Kasami codes, or polyphase codes. All these codes have a unique autocorrelation function. The aforesaid codes are thus advantageously suitable for use as a second portion of each transmission sequence.

The first portion and the second portion of a transmission sequence are preferably disposed serially or, alternatively, are interleaved with one another. With the serial disposition, what is emitted as a transmission sequence is firstly the unmodulated or constant-phase signal and then the phase-modulated signal, i.e., firstly the first portion and then the second portion. It is likewise possible to send out firstly the second portion and then the first portion of the transmission sequence. Particularly advantageously, the constant-phase or unmodulated signal can be generated in such a way that in this case the phase modulator is not activated and a constant phase is therefore established. For the second portions of the transmission sequences, on the other hand, the phase modulator is activated in order to generate a corresponding phase coding.

In an alternative embodiment of the present invention, the first portion and the second portion advantageously are additively superimposed. The transmission sequence thus represents a combination of a first portion and a second portion, that combination in particular being embodied to be longer in time than the respective first portion and second portion of a transmission sequence in which the first portion and second portion are disposed sequentially. It is thereby possible to achieve the same, or at least a similar, signal energy for the individual components of the transmission sequence (i.e., the constant-phase or unmodulated signal and the phase-modulated signal) as in the case of the sequential disposition. Because lidar sensor systems usually have a limited maximum output power level that must not be exceeded because of eye safety regulations, the emitted signal energy as a rule cannot be increased by increasing the output power level, but instead must be raised predominantly by extending the transmission duration. Additive superimposition of the first portion and second portion is advantageous because the two portions are emitted, and therefore also reflected, at the same time. The Doppler frequency and the distance to the reflecting object are thus identical for both portions, with the result that dynamic effects are suppressed and the Doppler frequency and the distance to the object can be ascertained more accurately than when the first portion and second portion are disposed sequentially.

The transmission unit advantageously has a frequency shifter in order to shift a frequency either of the first portion or of the second portion. In the case of additive superimposition of the first portion and second portion, detection of the Doppler frequency is made more difficult by the fact that the phase code of the second portion appears as additional noise. In order to avoid mutual interference between the two portions, a frequency shift of the two portions is advantageously accomplished in such a way that they can again be separated. Detection probability is thereby increased.

Particularly advantageously, provision is furthermore made that the reception unit has at least one filter. The filter serves to differentiate the first portion and second portion based on the frequency shift. This allows a separation of the received light signal into a region of the first portion and a region of the second portion, so that the corresponding portions can be handled separately from one another. Differences between the two portions thereby become possible, as described above with regard to the separation in time between the first portion and second portion based on the sequential disposition of those portions.

The transmission unit preferably has several parallel phase modulators in order to emit several transmission sequences in parallel. In particular, a dedicated transmission optic is provided for each phase modulator. The second portions of the transmission sequences emitted in parallel are preferably coded orthogonally to one another by the respective phase modulators. This makes possible a differentiation of each emitted transmission sequence in parallel with respect to the corresponding other transmission sequences emitted in parallel. A parallel lidar sensor system is thereby obtained. Advantageously, either a single reception optic or a single evaluation unit is provided for that purpose; alternatively, a plurality of reception optics and evaluation units are present in order to thereby to provide parallelization with respect to the reception unit as well.

The present invention also relates to a vehicle. The vehicle has a lidar sensor system as described above. Dependable and reliable detection of objects in the environment of the vehicle is thereby ensured, the costs for the vehicle being minimized as a result of the above-described configuration of the lidar sensor system.

BRIEF DESCRIPTION OF THE DRAWINGS

Exemplifying embodiments of the present invention will be described in detail below with reference to the figures.

DETAILED DESCRIPTION OF EXAMPLE EMBODIMENTS

Figure 1:
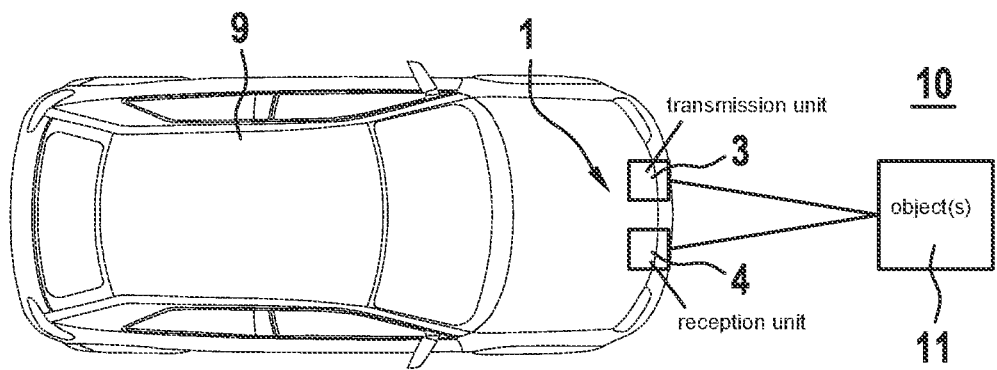
FIG. 1 is a schematic illustration of a vehicle in accordance with an exemplifying embodiment of the present invention.

FIG. 1 schematically shows a vehicle 9 in accordance with an exemplifying embodiment of the present invention. Vehicle 9 in turn has a lidar sensor system 1. Objects 11 in an environment 10 of lidar sensor system 1, and thus of vehicle 9, are detectable using lidar sensor system 1.

Lidar sensor system 1 has a transmission unit 3 and a reception unit 4. Transmission unit 3 serves to emit a light signal that is reflected from object 11, so that this reflected signal is receivable by reception unit 4. The light transit time, and thus the distance between lidar sensor system 1 and object 11, can be inferred based on a time shift between the emitted signal and the received signal. The Doppler effect that occurs furthermore allows an estimate of the velocity with which object 11 is moving.

Figure 2:
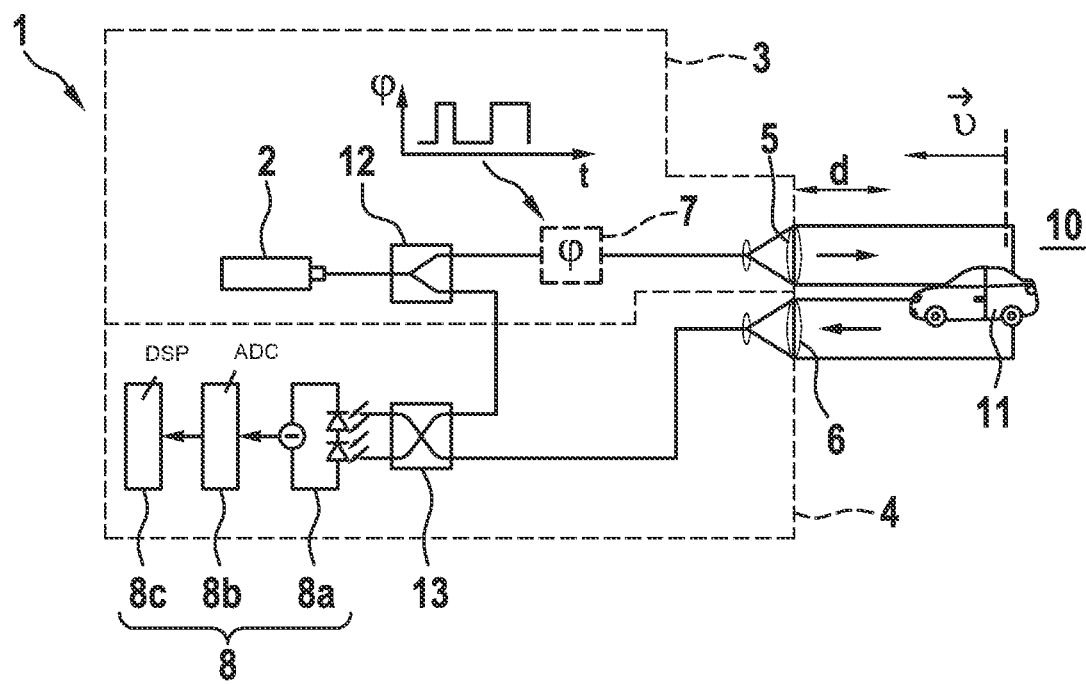
FIG. 2 is a schematic view of a first alternative of the lidar sensor system of the vehicle, in accordance with the exemplifying embodiment of the present invention.

Provision is made in principle that lidar sensor system 1 operates according to coherent phase code principles, so that the phase of an emitted laser light is varied. A first alternative for implementing a lidar sensor system 1 of this kind is shown in FIG. 2. Lidar sensor system 1 in accordance with the first alternative has, as described earlier, transmission unit 3 and reception unit 4. Transmission unit 3 encompasses a laser source 2, a phase modulator 7, and a transmission optic 5. Reception unit 4 has a reception optic 6 and an evaluation unit 8.

In order to emit a light signal by way of transmission unit 3, provision is made firstly that laser light is emitted by way of laser source 2. This light is directed from a splitter 12 both to reception unit 4 and to phase modulator 7. Phase modulator 7 serves to modulate the phase of the light of light source 2 so as thereby to generate a phase code. The light modulated in that manner is then emitted by transmission optic 5 into environment 10.

The emitted light is reflected by an object 11 in environment 10, and thus arrives at reception optic 6 of reception unit 4. From there the received light signal travels to a coupler 13 that couples in the light of laser light source 2 diverted via splitter 12. Lastly, an evaluation of the received signal can occur by way of evaluation unit 8. Evaluation unit 8 has a photodetector 8a and an evaluation logic system having an analog/digital converter 8b and a digital signal processor 8c.

In order to evaluate the received light signal, the received light signal is correlated with the phase code that was applied by phase modulator 7. Provision is made for this purpose that the phase code that was applied by phase modulator 7 possesses a unique autocorrelation function. For example, the applied phase code refers to a biphase code, in particular a Barker code, or to maximum length sequences or Gold codes or Kasami codes or polyphase codes. A time shift of the received light signal with respect to the emitted light signal can thus be ascertained based on the correlation. This time shift is characteristic of the light transit time between lidar sensor system 1 and object 11. A distance d between lidar sensor system 1 and object 11 can therefore be ascertained based on the phase shift.

The received light signal is, however, not only time-shifted but also Doppler-shifted in terms of its frequency. Evaluation unit 8 is therefore embodied firstly to perform a Doppler estimate so as then to arrive at a Doppler compensation. Provision is made for this purpose that phase modulator 7 divides an emitted transmission sequence 100 into two portions. This is schematically depicted in FIGS. 3A and 3B.

Figure 3A:
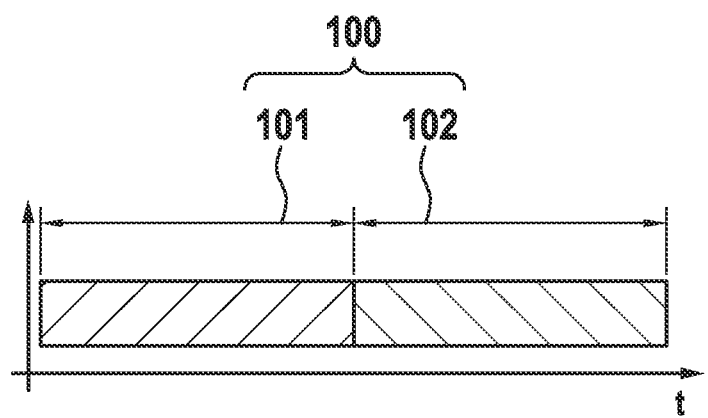
FIG. 3A shows a first variant of a transmission sequence that is emitted by the lidar sensor system of the vehicle, in accordance with the exemplifying embodiment of the present invention.
Figure 3B:
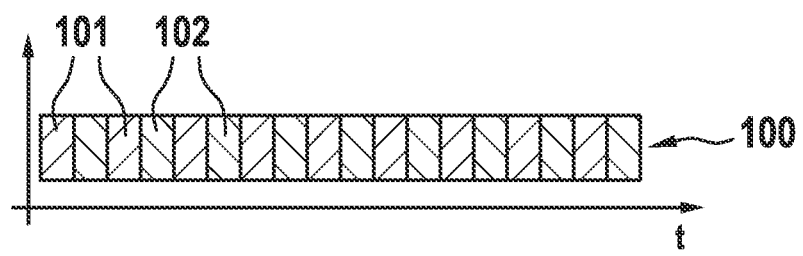
FIG. 3B shows a second variant of a transmission sequence that is emitted by the lidar sensor system of the vehicle, in accordance with the exemplifying embodiment of the present invention.

FIG. 3A shows a first variant, in which transmission sequence 100 is subdivided into two sequentially disposed portions 101, 102. First portion 101 is an unmodulated, constant-phase signal into which a phase code has not been introduced by phase modulator 7. In other words, for the generation of first portion 101, phase modulator 7 is not activated or is activated constantly. First portion 101 is followed by second portion 102, which has a phase code, i.e. is a signal phase-modulated by phase modulator 7. The second variant depicted in FIG. 3B also represents a transmission sequence 100 that is split into a first portion 101 and a second portion 102; in this variant, first portion 101 and second portion 102 are disposed in interleaved fashion. First portion 101 makes possible a Doppler estimate that, in particular, is not influenced by a phase code. Once a Doppler frequency has been estimated, it can be used to compensate second portion 102 so that the phase shift can be reliably and accurately ascertained.

Irrespective of the variant described above as shown in FIG. 3A and FIG. 3B, the transmission sequences are transmitted in the baseband. If the configuration of the lidar sensor system depicted in FIG. 2, which shows a real demodulator, is used, this yields in evaluation unit 8 the following signal $s_{CW}$ in the digital baseband for first portion 101:

$$s_{CW}(k) = \hat{A}_s \cdot \cos(\omega_D k T_s + \omega_0 \tau) n_s(k)$$

The signal $c_{RX}$ is analogously obtained for second portion 102:

$$c_{RX}(k) = \hat{A}_\ell \cdot \cos(\omega_D k T_s + \omega_0 \tau - \phi(k T_s - \tau)) + n_c(k)$$

k: digital run variable k∈ ℕ 0;
Ts: sampling interval, corresponding to inverse of sampling time: fs=1/Ts;
Â: signal amplitude, encompassing damping over signal path, gain in the mixing process and due to amplifiers, etc.;
ωD: angular frequency of Doppler frequency;
ω0τ: phase shift resulting from time of flight, referred to angular carrier frequency;
n(k): combined discretized noise (shot noise, thermal noise, phase noise);
ϕ(kTs−τ): time-shifted code sequence.

Because first portion 101 and second portion 102 are transmitted with a time offset, the corresponding parts of the received signal can also be correspondingly identified.

Figure 4A:
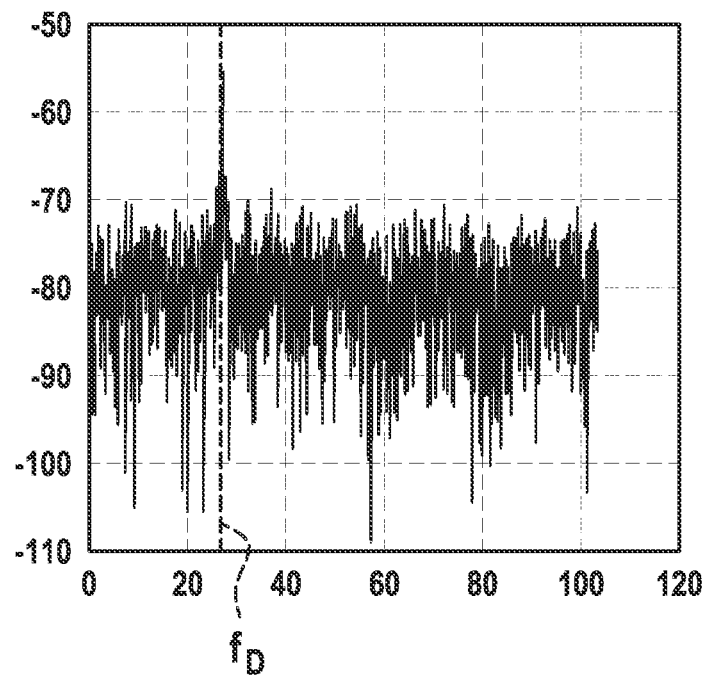
FIG. 4A is an exemplifying view of a spectrum for Doppler estimation (the abscissa shows frequency in MHz, and the ordinate shows amplitude in dB).

Evaluation unit 8 is embodied to investigate signal $s_{CW}$ by way of an FFT analysis in order to ascertain Doppler frequency $f_D$. An exemplifying spectrum for ascertaining Doppler frequency $f_D$ is shown in FIG. 4A.

Doppler frequency $f_D$ ascertained in this manner is then used to estimate distance d by correlation between a corrected code template $c_T$ and the received code signal $c_{RX}$. Code template $c_T$ is corrected on the basis of Doppler frequency $f_D$, with the result that a Doppler compensation is effected. Preferably, two code templates $c_T$ are correlated with the received signal, resulting in maximized detection performance. Alternatively, the aforesaid correlation can also be carried out with only a single code template. The variant with two code templates will be presented below.

The first code template is $$c_{TC}(k) = \cos(\tilde{\omega}_D k T_s - \phi(kT_s))$$

But because the phase term $\omega_0 \tau$ is unknown, a cross-correlation with the sine version is also carried out:

$$c_{TC}(k) = \sin(\tilde{\omega}_D k T_s - \phi(kT_s))$$

$\tilde{\omega}_D$ here describes the respective previously estimated Doppler angular frequency, i.e. Doppler frequency $f_D$ multiplied by $2\pi$. The correlation can then be mathematically described in the same manner for both templates as shown below, where $c_T$ respectively denotes the cosine version or sine version of the template:

$$R_{sc}(u) = \sum_{k=0}^{N_{CS}} c_{RX}(k) c_T(k-u)$$

$N_{CS}$ here is the length of the code sequence and is obtained as $N_{CS} = T_{CS} \cdot f_S$, where $T_{CS}$ is the total duration of the code sequence. The two correlation functions for the various template functions can then be combined as follows:

$$R_{SCges}(u) = |R_{SCsin}(u)| + |R_{SCcos}(u)|$$

The frequency resolution $\Delta f$ of the Doppler estimate is obtained from the transmission duration of first portion 101. Frequency resolution $\Delta f$ corresponds approximately to the reciprocal of the transmission duration of first portion 101, i.e. $\Delta f \approx 1/T_{CW}$.

The distance resolution $\Delta d$ depends on the bandwidth $B_C$ of the phase code of second portion 102, and is expressed approximately as:

$$\Delta d \approx c_0/(2B_c).$$

The time duration of first portion 101 and/or of second portion 102 is, in particular, between 3 μs and 20 μs. A typical bandwidth of the phase code of second portion 102 is, in particular, in the range between several hundred MHz and a few GHz.

Figure 4B:
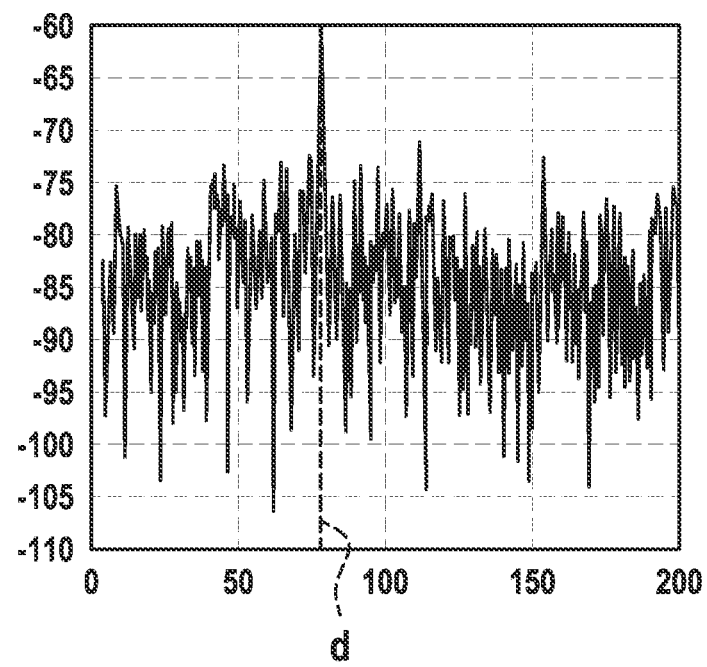
FIG. 4B is an exemplifying view of a spectrum for distance estimation (the abscissa shows distance in m, and the ordinate shows amplitude in dB).

FIG. 4B schematically shows the estimating of distance d between lidar sensor system 1 and object 11. Said estimate of distance d is made based on the determination of the time shift of the received light signal, i.e. of signal $c_{RX}$. This determination can be carried out in simple and reliable fashion because a Doppler compensation has already been performed.

Figure 5:
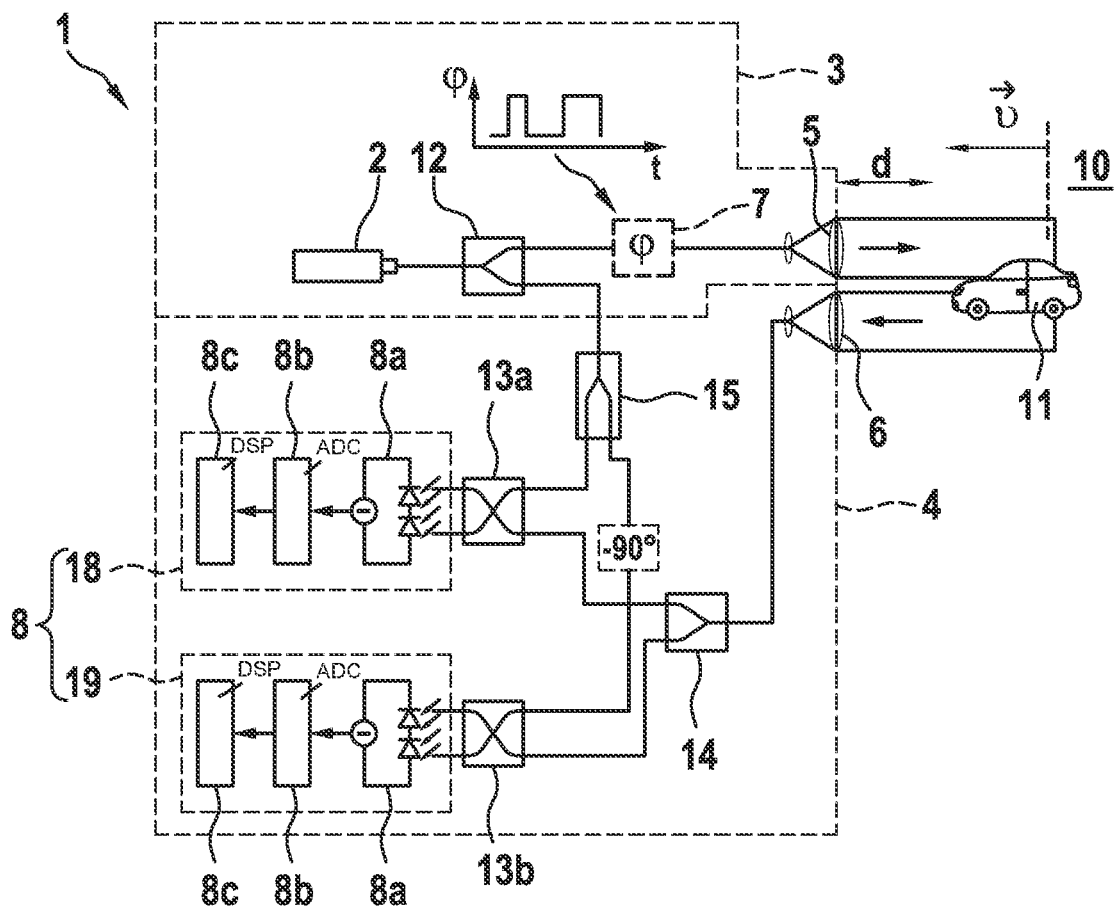
FIG. 5 is a schematic view of a second alternative of the lidar sensor system of the vehicle, in accordance with the exemplifying embodiment of the present invention.

FIG. 5 schematically shows a second variant of lidar sensor system 1 of vehicle 9, in accordance with the exemplifying embodiment of the present invention. Transmission unit 3 is analogous to that of the first variant as described above. One difference involves reception unit 4, which has a complex demodulator 18, 19 in the second variant depicted in FIG. 5. For this, a first evaluation unit 18 is provided for the I path, and a second evaluation unit 19 for the Q path. First evaluation unit 18 and second evaluation unit 19 each have a dedicated photodetector 8a and a dedicated evaluation logic system having an analog/digital converter 8b and a digital signal processor 8c.

Reception unit 4 furthermore has a first additional splitter 15 that splits the reference signal from splitter 12 of transmission 3 again and transfers it to the respective coupler 13a, 13b of the corresponding paths of complex demodulator 18, 19. Provision is made in this context that a phase offset of 90° is introduced for the Q path. Also present is a second additional splitter 14 that splits the light received from reception optic 6 onto the two paths of complex demodulator 18, 19.

The fundamental principle of operation is analogous to that described above. Complex demodulator 18, 19 also makes possible, however, a correct-sign Doppler estimate and thus a determination of the velocity v of object 11 in terms of not only absolute value but also the correct sign.

Figure 6:
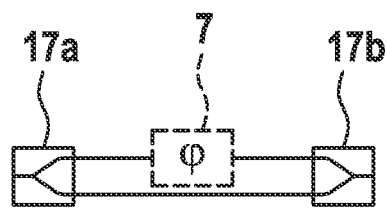
FIG. 6 is a schematic detail view of a third variant of the lidar sensor system of the vehicle, in accordance with the exemplifying embodiment of the present invention.

As described above, first portion 101 and second portion 102 are emitted sequentially. An alternative to this is schematically depicted in FIG. 6. Phase modulator 7 as shown in FIGS. 2 and 5 is replaced here by the configuration shown in FIG. 6. This means that the new phase modulator 7 is provided between a signal divider 17a and a signal combiner 17b, with the result that a constant signal is also transferred in parallel with the phase-modulated signal. The final effect is thus an additive superimposition of the phase-modulated signal from phase modulator 7 and the constant signal. First portion 101 and second portion 102 are thus additively superimposed in transmission sequence 100. In contrast to the above-described phase modulator 7, phase modulator 7 shown in FIG. 6 therefore no longer needs to be not activated, or constantly activated, in order to generate portion 101. Instead, an additive superimposition of the constant signal occurs continuously as a result of the lower light path as depicted in FIG. 6.

In order to achieve the same signal energy for first portion 101 and second portion 102 as in the above-described variant, the transmission duration is advantageously extended, with the result that the length over time of transmission sequences 100 increases. Alternatively, the output power level of lidar sensor system 1 can also be increased, although because of eye safety requirements this is generally impossible or inadvisable. For example, the superimposed signal components, i.e. first portion 101 and second portion 102, can have only half as much output power as before when they are emitted simultaneously.

One advantage of this simultaneous emission of first portion 101 and second portion 102 is contemporaneous reflection of those signals at object 11. The two portions 101, 102 are therefore subject to the same influences, since the distance and Doppler are identical. In contrast thereto, with the above-described sequential emission of first portion 101 and second portion 102 a time offset always exists, even though it is usually negligibly small.

Figure 7:
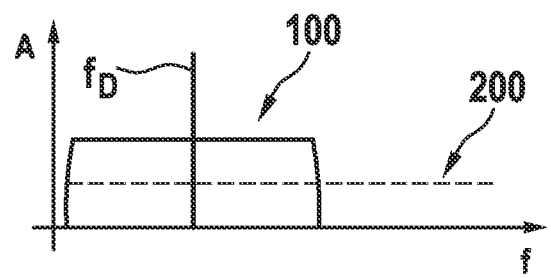
FIG. 7 shows an exemplifying spectrum for Doppler estimation.

The additive superimposition of first region 101 and second region 102 thus results in a more accurate estimate of distance d and velocity v. Detection of the Doppler frequency $f_D$ is more laborious, however, as depicted in FIG. 7. Bandwidth $B_C$ of the phase code of second portion 102 produces an additional noise 100 in addition to baseline noise 200 when the intention is to determine Doppler frequency $f_D$ by FFT analysis (see FIG. 7).

Figure 8A:
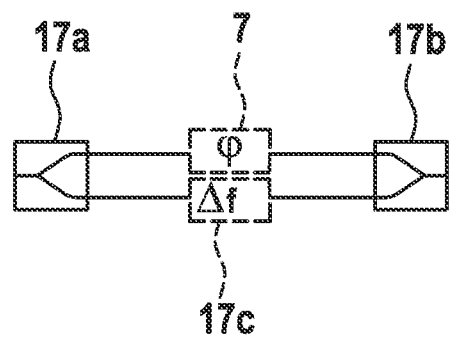
FIG. 8A is a schematic detail view of a fourth alternative of the lidar sensor system of the vehicle, in accordance with the exemplifying embodiment of the present invention.
Figure 8B:
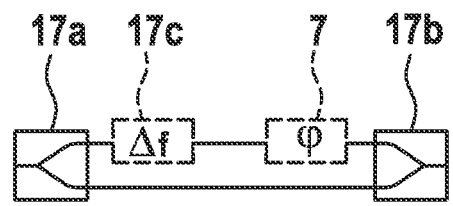
FIG. 8B is a schematic detail view of a fifth alternative of the lidar sensor system of the vehicle, in accordance with the exemplifying embodiment of the present invention.

Particularly advantageously, for improved identification of Doppler frequency $f_D$ a variant is provided in which a frequency shift of first portion 101 and of second portion 102 is present. Variants of this kind are shown in FIGS. 8a and 8b. FIG. 8A shows a configuration similar to FIG. 6, the frequency of the constant-phase signal being shifted by a frequency shifter 17c. FIG. 8B shows a variant in which the frequency of the phase-modulated signal is shifted by frequency shifter 17c.

The basic configuration of lidar sensor system 1, and the operating sequence of evaluation unit 8 in order to estimate Doppler frequency $f_D$ and distance d and velocity v, are analogous to what has been described above. The detectability of first portion 101 and second portion 102 is simplified because of the frequency shift between the corresponding portions 101, 102.

Figure 9:
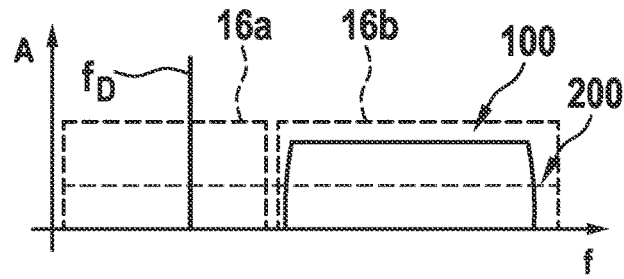
FIG. 9 is an exemplifying view of a spectrum for Doppler estimation.

FIG. 9 schematically shows the same spectrum as the one shown in FIG. 7. Here, however, the additional noise 100 that occurs in addition to baseline noise 200 because of bandwidth $B_C$ of second portion 102 is shifted with respect to Doppler frequency $F_D$. First portion 101 and second portion 102 can thus be distinguished from one another by way of corresponding filters 16a and 16b. This allows improved identification of Doppler frequency $f_D$, and thus simple and reliable Doppler compensation. Mutual interference between first portion 101 and second portion 102 is thus avoided.

Figure 10:
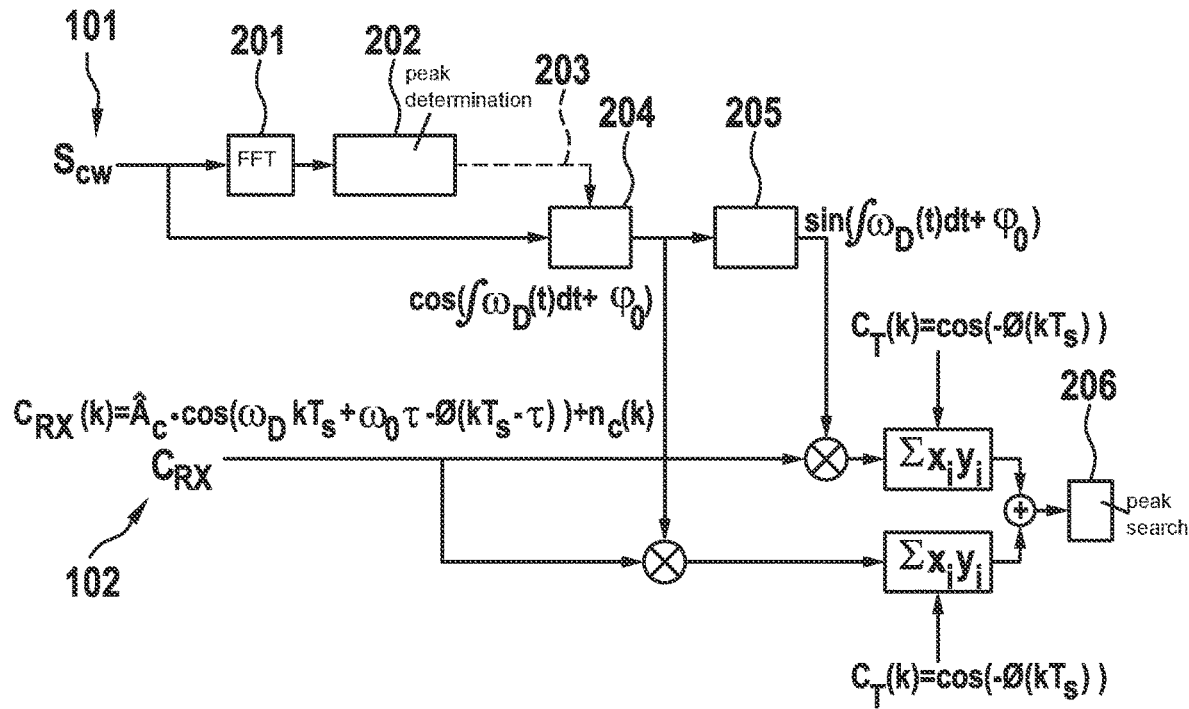
FIG. 10 is a schematic view of a signal processing plan for Doppler estimation.

FIG. 10 schematically shows a signal flow diagram of one possibility for Doppler correction. In general, it cannot be assumed that the Doppler frequency is an ideal, constant frequency as schematically depicted in the preceding spectra. While a corresponding assumption can simplify the estimating method for estimating the Doppler frequency, and very good values can already be obtained therewith, the procedure shown in FIG. 10 is used for even more accurate estimation. In particular, slight changes in Doppler frequency $f_D$ over the measurement duration, which can occur e.g. due to movements of object 11 and/or vibration of object 11 and/or phase noise of the laser light, can thereby be accounted for. The exact nature of the Doppler signal, in the form of a peak function having a finite width, can be accounted for before correlation by way of the mixing process explained in FIG. 10. In particular, the procedure shown in FIG. 10 is carried out entirely digitally, in particular in digital signal processor 8c.

Firstly, Doppler frequency $f_D$ is estimated from first portion 101; this is done in particular by way of an FFT transform 201 and subsequent peak determination 202. This yields a Doppler estimate 203 that can be used as a filter frequency for a bandpass filter 204. The bandpass is sufficiently wide that the nature or bandwidth of the Doppler signal remains unchanged. The filtered Doppler signal can then be used for mixing with the Doppler-shifted code signal, i.e. the received second portion 102. Because an unknown phase shift that corresponds to distance d is present in second portion 102, a 90° rotation of the processed Doppler signal can optionally be accomplished by way of a Hilbert transform 205.

If the aforesaid Hilbert transform 205 is performed— which, as described above, is merely optional—this results in a mixing of second portion 102 both with the signal merely filtered by way of bandpass filter 204 and with the Hilbert-transformed signal. If a corresponding Hilbert transform is not carried out, only the filtered signal is mixed with the second portion. After the one or both mixers, a respective correlation is performed with the uncompensated code template; if the Hilbert transform has been used, the absolute values of the two results are then added. In the absence of a Hilbert transform, only one result is present in any case.

The result, or the added result, can then be used for the peak search 206 to ascertain the distance.

One advantage of lidar sensor system 1 is that several targets can be detected. If, for example, several targets 11 were encountered in the context of the above-described sequential emission of first portion 101 and second portion 102, several frequency peaks would then be visible in the spectrum as shown in FIG. 4A, i.e. several Doppler frequencies $f_D$ would be present. The individual distances d of the different objects 11 can then be ascertained iteratively by compensated correlation, as described above. Lidar sensor system 1 thus makes possible a reliable distinction among several objects 11, lidar sensor system 1 being capable of reliably ascertaining the individual distances of those objects 11.

Figure 11:
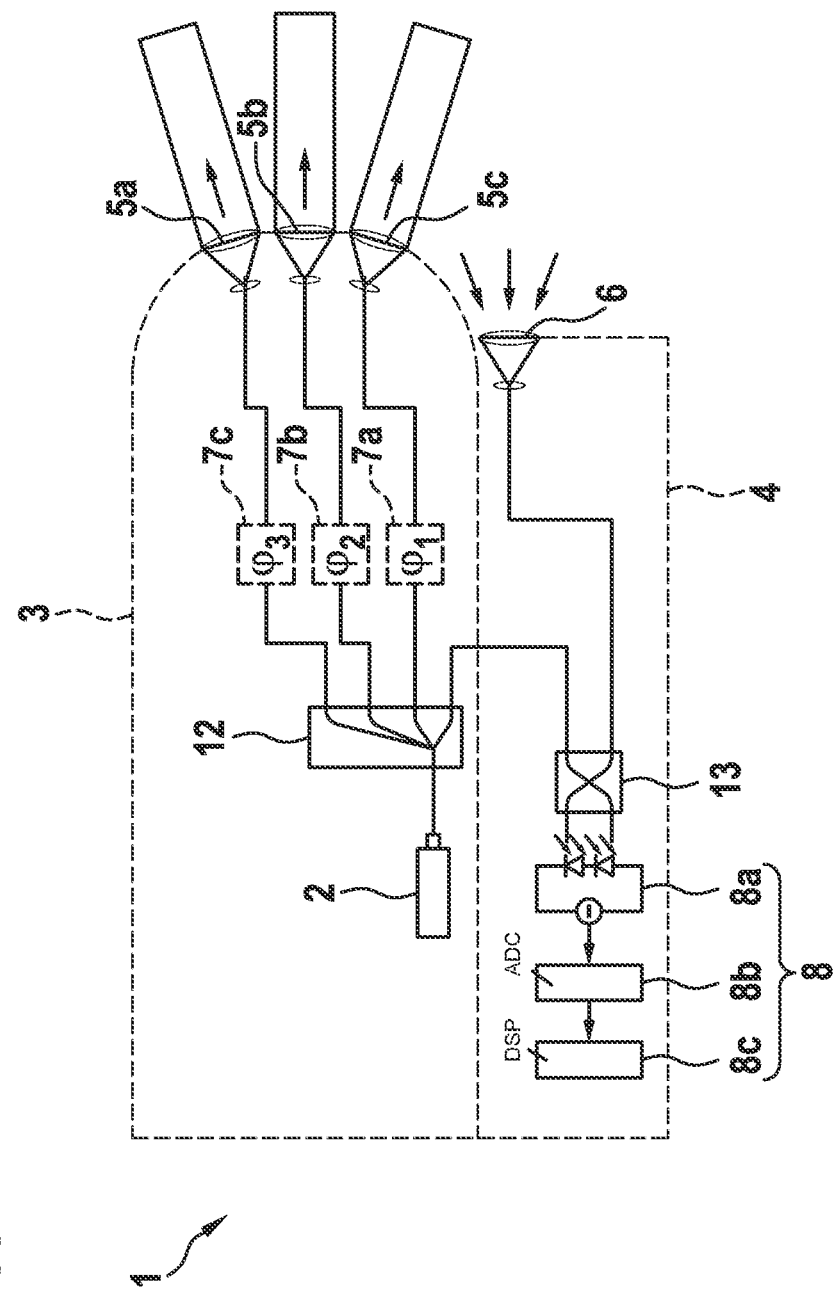
FIG. 11 is a schematic detail view of a sixth alternative of the lidar sensor system of the vehicle, in accordance with the exemplifying embodiment of the present invention.

Lastly, FIG. 11 shows a further variant of lidar sensor system 1, the same reception unit 4 as in FIG. 2 being used in this case.

Transmission unit 3 differs in that a parallelization is effected. As a result of such parallelization, lidar sensor system 1 is suitable in particular for use in vehicles. Several transmitted pixels are processed using the same reception channel, thereby reducing costs.

Transmission unit 3 has several phase modulators 7a, 7b, 7c; each of phase modulators 7a, 7b, 7c introduces, by phase modulation, a different code into the laser light of laser source 2. All these codes are orthogonal to one another, so that correlation of the various codes results not in a peak but merely in noise. The signals coded by way of phase modulators 7a, 7b, 7c can be emitted via dedicated transmission optics 5a, 5b, 5c.

Transmission unit 3 can thus simultaneously send out several transmission sequences 100; FIG. 11 illustrates, by way of example, the capability for parallel emission of three transmission sequences 100. All these transmission sequences 100 differ, in terms of their respective second portion 102, in that the coding of second portion 102 is respectively orthogonal to the other two portions 102 of transmission sequences 100 that are sent out in parallel.

As described earlier, FIG. 11 depicts by way of example the fact that all these emitted transmission sequences 100 are received and evaluated via one common reception optic 6 and one common evaluation unit 8. A plurality of reception optics 6 and/or evaluation units 8 can alternatively be provided here, so that each transmission sequence 100 generated in parallel can also be processed via its own reception channel, i.e. via its own reception optic 6 and its own evaluation unit 8.

In a spectrum such as the one shown in FIG. 4A, a configuration of lidar sensor system 1 as shown in FIG. 11 would in turn produce several peaks that indicate corresponding Doppler frequencies $f_D$. Each emitted transmission sequence 100 has a corresponding peak assigned to it if the corresponding transmission sequences 100 have been reflected at an object 11. In order to determine the pertinent distances of the corresponding transmission channels, the simplest variant that can be used is to compensate, with each detected Doppler frequency $f_D$, for all the codes of phase modulators 7a, 7b, 7c which are used to generate second portions 102 of transmission sequences 100. Those compensated codes are then correlated with the received second portions 102. If Doppler frequency $f_D$ and the code of the respective phase modulator 7a, 7b, 7c yield a peak in the correlogram, the frequency and channel, as well as the distance, are then defined by the peak position in the correlogram. A trial-and-error method of this kind is easy to implement.

Figure 12:
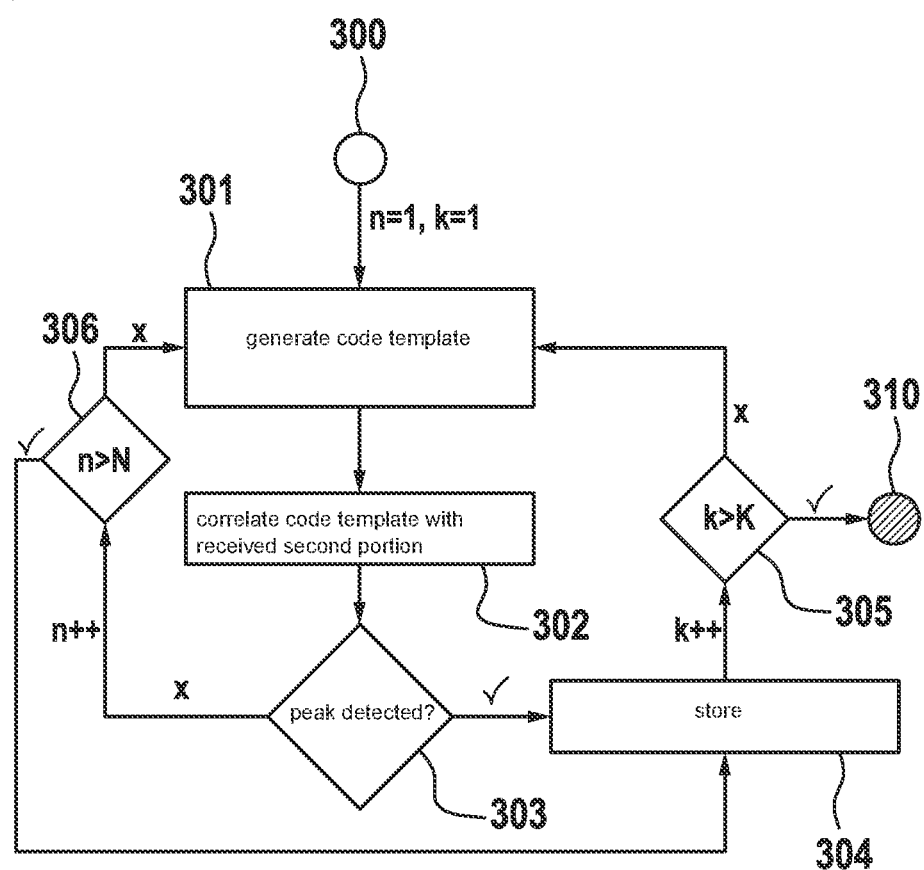
FIG. 12 is a schematic view of a signal processing plan for Doppler estimation, in the context of use of the lidar sensor system in accordance with the sixth alternative.

FIG. 12 is a flow diagram of how such a method is to be carried out, in which K represents the number of detected Doppler frequencies $f_D$ and N the number of transmission channels or codes, i.e. the number of frequency modulators 7a, 7b, 7c. When the method starts 300, run variables n and k are furthermore each set to 1, run variable n being a reference for the transmission channels or codes, and k being a reference for the detected Doppler frequencies $f_D$. Firstly a generating step 301 is performed, in which a code template is created using Doppler frequency k and phase code n. This is followed by a step of correlating 302 the previously generated template with the received second portion 102. The subsequent procedure is determined by a peak detection query 303. If a peak has been detected, a storage step 304 is performed in which the result arrived at is stored. Run variable n is furthermore set to 1. Run variable k is then incremented, and is checked via a Doppler number query 305. If run variable k is greater than the number K, the method has been completely executed and ends 310. If not, however, further Doppler frequencies $f_D$ then need to be checked, and the method therefore proceeds back to generating step 301 with a run variable k that has now been incremented.

If what is ascertained in query 303 is, however, that a peak has not been detected, run variable n is then incremented and a code number query 306 is made. If run variable n is greater than the number N, the above-described storage step 304 is then performed again and the method proceeds as described above. If run variable n is not greater than the number N, however, generating step 301 is then performed again, this time with an incremented run variable n.

Lidar sensor system 1 thus allows a secure and reliable determination of the distance and velocity, or at least an absolute value of the velocity, of an object 11 in the surroundings of lidar sensor system 1. Both parallelization, and detection of several objects 11, are possible. A simple and uncomplicated configuration of lidar sensor system 1 is furthermore enabled. Because of its low manufacturing cost, lidar sensor system 1 is therefore optimal for use in vehicles.

What is claimed is:

1. A lidar sensor system, comprising
a transmission unit having a laser source, a phase modulator configured to modulate a phase of light of the laser source, and a transmission optic configured to emit the light modulated by the phase modulator into an environment of the lidar sensor system; and
a reception unit having a reception optic configured to receive light reflected from an object of the environment and having an evaluation unit configured to evaluate the light received by the reception optic;
wherein the transmission unit is configured to emit several transmission sequences of the light, each transmission sequence of the transmission sequences having a first portion and a second portion, the first portion being an unmodulated constant-phase signal, and the second portion being a signal phase-modulated by the phase modulator,
wherein the evaluation unit is configured to determine at least an absolute value of a Doppler frequency based on the first portion, and to determine a distance to the object based on the Doppler frequency and the second portion, and
wherein the transmission unit has several parallel phase modulators configured to emit several transmission sequences in parallel, the second portions of the transmission sequences emitted in parallel being coded orthogonally to one another by respective ones of the phase modulators.

2. The lidar sensor system as recited in claim 1, wherein the evaluation unit is a simple demodulator or has a complex demodulator.

3. The lidar sensor system as recited in claim 1, wherein the evaluation unit includes a photodetector, and an evaluation logic system including an analog/digital converter, and a digital signal processor.

4. The lidar sensor system as recited in claim 1, wherein the second portion of each transmission sequence of the transmission sequences is a unique code, the codes possessing a unique autocorrelation function.

5. The lidar sensor system as recited in claim 4, wherein the codes are biphase Barker codes or maximum length sequences or Gold codes or Kasami codes or polyphase codes.

6. The lidar sensor system as recited in claim 1, wherein the first portion and the second portion of a transmission sequence are disposed serially or are interleaved with one another.

7. The lidar sensor system as recited in claim 1, wherein the first portion and the second portion of each transmission sequence are additively superimposed.

8. The lidar sensor system as recited in claim 7, wherein the transmission unit has a frequency shifter configured to shift a frequency either of the first portion or of the second portion.

9. The lidar sensor system as recited in claim 8, wherein the reception unit has at least one filter configured to differentiate the first portion and the second portion based on the frequency shift.

10. A vehicle, comprising:
a lidar sensor system including:
a transmission unit having a laser source, a phase modulator configured to modulate a phase of light of the laser source, and a transmission optic configured to emit the light modulated by the phase modulator into an environment of the lidar sensor system, and
a reception unit having a reception optic configured to receive light reflected from an object of the environment and having an evaluation unit configured to evaluate the light received by the reception optic,
wherein the transmission unit is configured to emit several transmission sequences of the light, each transmission sequence of the transmission sequences having a first portion and a second portion, the first portion being an unmodulated constant-phase signal, and the second portion being a signal phase-modulated by the phase modulator,
wherein the evaluation unit is configured to determine at least an absolute value of a Doppler frequency based on the first portion, and to determine a distance to the object based on a Doppler frequency and the second portion, and
wherein the transmission unit has several parallel phase modulators configured to emit several transmission sequences in parallel, the second portions of the transmission sequences emitted in parallel being coded orthogonally to one another by respective ones of the phase modulators.

* * * * *